Sept. 16, 1947. K. BALLINGER Re. 22,914

TRAILER

Original Filed Nov. 15, 1943 2 Sheets-Sheet 1

Inventor

KARL BALLINGER

By Clarence A. O'Brien and Harvey B. Jacobson

Attorneys

Sept. 16, 1947. K. BALLINGER Re. 22,914

TRAILER

Original Filed Nov. 15, 1943 2 Sheets-Sheet 2

Inventor

KARL BALLINGER

By Clarence A. O'Brien and Harvey B. Jacobson

Attorneys

Reissued Sept. 16, 1947 Re. 22,914

UNITED STATES PATENT OFFICE 22,914

TRAILER

Karl Ballinger, Coloma, Mich., assignor, by direct and mesne assignments, to Sporting Specialties Company, Coloma, Mich., a corporation of Michigan Original No. 2,375,754, dated May 15, 1945, Serial No. 510,348, November 15, 1943. Application for reissue June 22, 1945, Serial No. 600,892

3 Claims. (Cl. 280—33.4)

My present invention relates in general to carriers and has more particular reference to a trailer device for carrying boats and other transferable objects, the invention having specific application to a carrier adapted to be drawn by a suitable tractor, such as an automobile or other tractor means.

An important object is to provide a light, yet strong, carrier device or trailer for transporting boats and other objects and having yielding means for resiliently supporting the object being carried in the trailer device.

Another object is to provide a trailer for transporting boats and the like which when loaded has a low center of gravity so that it will hug the road and not skid from side to side, is easy to load and unload, and adapted for adjustment to transport boats of different sizes.

Other and subordinate objects are also comprehended by my invention, all of which, together with the precise nature of my improvements, will be readily understood when the succeeding description and claims are read with reference to the drawings accompanying and forming part of this specification.

Figure 1:
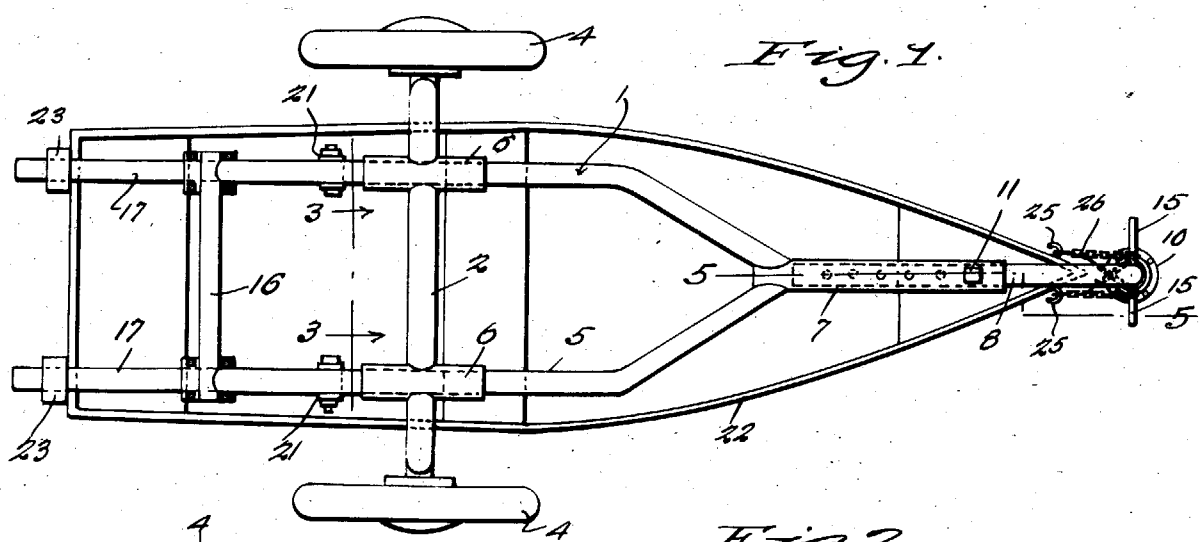
Figure 2:
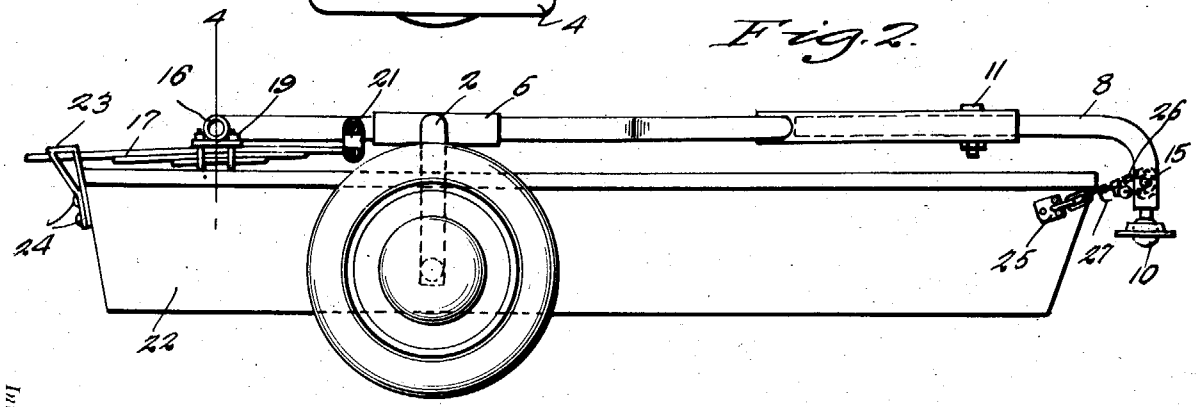
Figure 3:
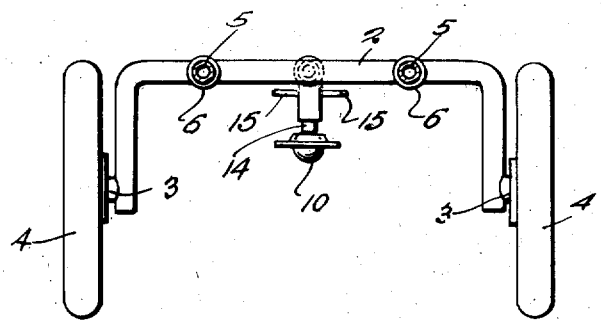
Figure 4:
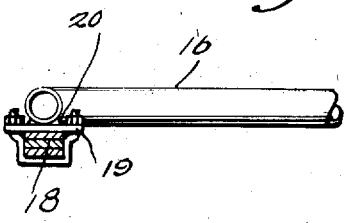
Figure 6:
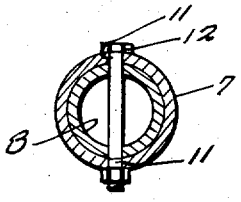
Figure 5:
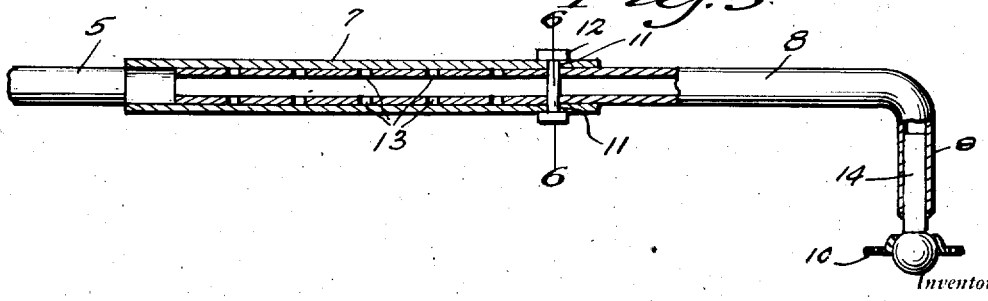

In said drawings:

Figure 1 is a view in top plan of my improved trailer illustrating the manner in which a boat is carried thereby, Figure 2 is a view in side elevation, Figure 3 is a view in transverse section taken on the line 3—3 of Figure 1, Figure 4 is a view in transverse section taken on the line 4—4 of Figure 2 and drawn to an enlarged scale, Figure 5 is a fragmentary view in longitudinal section taken on the line 5—5 of Figure 1 and drawn to an enlarged scale, Figure 6 is a view in transverse section taken on the line 6—6 of Figure 5 and drawn to a further enlarged scale.

As shown in the drawings, a preferred embodiment of the invention may comprise a main chassis frame 1, which may conveniently be made of tubular structural members. The frame 1 preferably embodies a transverse, arched member 2 providing spaced, downwardly extending legs and a medial portion interconnecting the legs. The legs carry a pair of laterally outstanding wheel spindles 3 which, in turn, carry ground wheels 4 suitably mounted thereon. The wheels may be of any suitable construction, such as disc wheels carrying rubber or other tires. The frame comprises a pair of longitudinally extending side members 5 which extend through, and are suitably fixed intermediate their ends in a pair of sleeves 6 forming part of the member 2 and located upon opposite sides of the center of said member. The side members 5 converge at their front ends and are suitably joined to the rear end of a front sleeve section 7, also of tubing, and arranged in the longitudinal center of the chassis frame.

A tubular draft tongue 8 is slidably mounted in the sleeve section 7 to extend forwardly therefrom and is provided with a downturned front end 9 equipped with a coupling 10 of any suitable type for coupling the trailer to tractor means, not shown.

The tongue 8 is adjustable in the sleeve section 7 to vary the over-all length of the trailer; and means is provided for securing the tongue in adjusted position in the sleeve section. To this end, a pair of vertically aligned holes 11 may be provided in the front end of the sleeve section 7 to receive a fastening bolt 12; and the tongue 8 may be formed with longitudinally spaced pairs of aligned bolt holes for selective reception of the bolt 12, therethrough to thus provide for adjusting the tongue 8 forwardly and rearwardly in the sleeve section 7 to extend or contract the overall length of the chassis frame. The coupling 10 may comprise a shank 14 suitably fixed in the downturned end 9 of said draft tongue 8. A pair of studs 15 extend laterally from the downturned end 9 of said tongue 8, upon opposite sides of the tongue, and form a cleat for a purpose presently seen.

A cross member 16 connects the rear ends of the side members 5, as best shown in Figure 1. A pair of cantilever springs 17 are secured to said cross member 16 by central spring clips 19 welded, as at 20, to said cross member 16, the front ends of the springs 17 being connected to the side members 5 by shackles 21, and said springs extending rearwardly from said side members 5 in alignment therewith.

The boat 22, according to my invention, is suspended from the springs 17 and the studs 15 as follows:

A pair of skeleton, flat, metal hangers 23 are suitably secured, as at 24, to the stern of the boat, adjacent opposite sides thereof, to extend above the stern and through which the rear ends of the springs 17 are suitably extended, it being understood that said hangers are removable from said springs when desired. A pair of hook members 25 are provided on the prow of the boat 22 upon opposite sides of the same. A pair of chains 26 are attached each at one end thereof to one of said hook members 25, extended forwardly around the studs 15, respectively, and then extended rearwardly and crossed with their other ends attached to links of said chains by terminal hooks 27 on said other ends thereof.

As will now be seen, my improved trailer provides for carrying the boat in underslung position relative to the frame 1 so that the center of gravity is low and the trailer will not skid from side to side or easily turn over. Also, the boat is spring-suspended so as to minimize shock and jar, the frame 1 may be extended, in the manner already described, for carrying boats of different lengths and the entire vehicle may be inexpensively constructed for the most part of stock tubing to provide for lightness in weight without sacrificing strength and durability.

It is thought that the invention and its attendant advantages will be fully understood from the foregoing description; and it is obvious that numerous changes may be made in the form, construction and arrangement of the several parts without departing from the spirit or scope of the invention and without sacrificing its attendant advantages, the form herein disclosed being a preferred embodiment for the purpose of demonstrating the invention.

The invention is hereby claimed as follows:

1. In a trailer for transporting a boat and coupling to a tow vehicle, a chassis frame comprising a pair of spaced elongated side members extending in substantially parallel relation from the rear toward the front thereof and then converging at their front ends, a front sleeve section secured at the rear end thereof to said side members at their point of convergence and extending forwardly therefrom, a tubular draft tongue slidably mounted within said front sleeve section and extending forwardly therefrom, means at the forward end of said tongue adapted to couple said chassis frame to a tractor, a transverse arch member, a pair of spaced tubular supporting means integral with said arch member for receiving and supporting said side members between the ends thereof, said arch member being longer than the space between said side members and extending downwardly outside thereof, a pair of ground wheels supporting said arch member, means to suspend one end of a boat from the draft tongue, spring means attached to the rear ends of said side members adapted to suspend the other end of the boat, said spring means comprising a pair of springs extending rearwardly from the rear ends of said side members and having free rear ends, and hangers for attaching the said other end of the boat to the rear ends of said springs and through which the said free ends of the said springs extend.

2. In a trailer for transporting a boat and coupling to a tow vehicle, a chassis frame comprising a pair of spaced elongated side members extending in substantially parallel relation from the rear toward the front thereof and then converging at their front ends, a front sleeve section secured at the rear end thereof to said side members at their point of convergence and extending forwardly therefrom, a tubular draft tongue slidably mounted within said front sleeve section and extending forwardly therefrom and adjustable therein, means at the forward end of said tongue adapted to couple said chassis frame to a tractor, a transverse arch member, a pair of spaced supporting means on said arch member for receiving and supporting said side members between the ends of said side members, the length of said transverse arch member being greater than the distance between said side members and extending downwardly outside thereof, a pair of ground wheels supporting said arch member, means to suspend one end of a boat from said tongue, spring means supported from the rear ends of said side members adapted to suspend the other end of the boat, said spring means comprising a pair of springs extending rearwardly from the underside of the rear ends of said side members and having free rear ends, and hangers for attaching the other end of the boat to the rear ends of said springs and through which said free ends of said springs extend.

3. In a trailer for transporting a boat and coupling to a tow vehicle, a chassis frame comprising a pair of spaced elongated side members extending in substantially parallel relation from the rear toward the front thereof and then converging at their front ends, a cross member connecting the rear ends of said side members together, a front sleeve section secured at the rear end thereof to said side members at their point of convergence and extending forwardly therefrom, a tubular draft tongue slidably mounted within said front sleeve section and extending forwardly therefrom and adjustable therein, a transverse arch member, a pair of spaced supporting means on said arch member between the ends thereof for receiving and supporting said side members between the ends of said side members, the length of said transverse arch member being greater than the distance between said side members and extending downwardly outside thereof, a pair of ground wheels supporting said arch member, and means to suspend a boat from said tongue, spring means carried by the rear ends of said side members adapted to suspend the other end of the boat, said spring means comprising a pair of cantilever springs extending rearwardly from the rear ends of said side members and having free rear ends, spring clips on said cross member to support said springs at substantially the center thereof, shackles on said side members to secure the forward ends of said springs in place, and hangers for attaching the other end of the boat to the rear ends of said springs and through which said free ends of said springs extend.

KARL BALLINGER.

REFERENCES CITED

The following references are of record in the file of this patent:

UNITED STATES PATENTS

| Number | Name | Date |
|---|---|---|
| 1,655,454 | Clay | Jan. 10, 1928 |
| 2,019,256 | Dutton | Oct. 29, 1935 |
| 1,337,861 | Volk | Apr. 20, 1920 |
| 1,597,634 | Stephens | Aug. 24, 1926 |
| 1,242,390 | Turnbow | Oct. 9, 1917 |